Patented Nov. 15, 1938

2,137,206

UNITED STATES PATENT OFFICE 2,137,206

SOLVENT REFINING HYDROCARBON OIL

Francis X. Govers, Vincennes, Ind., assignor to The Indian Refining Company, Lawrenceville, Ill., a corporation of Maine No Drawing. Application January 28, 1937, Serial No. 122,787

4 Claims. (Cl. 196—13)

This invention relates to refining hydrocarbon oil by treatment with a selective solvent.

The invention broadly contemplates refining hydrocarbon oil with a selective solvent adapted to remove undesired constituents and produce therefrom a refined product having desired characteristics.

The invention has particular reference to the treatment of mineral oil with methyl furfural, and particularly 5-methyl furfural, a compound having the following chemical formula:

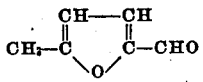

This compound has a boiling point of around 368° F. and a specific gravity of around 1.1087. It may be synthesized from sugar, hydrochloric acid and stannous chloride, according to the method outlined on page 62, Volume XIV, of Organic Synthesis (W. W. Hartman, editor).

I have discovered that methyl furfural provides a satisfactory extraction solvent for the treatment of mineral oil. When mixed with oil in the proper proportions, and under suitable conditions of temperature, the resulting mixture will separate into phases, one of which contains the non-paraffinoid type of hydrocarbon constituents, dissolved in the bulk of the solvent, while the other phase comprises the relatively paraffinoid constituents of the oil mixed with some of the solvent.

I have found that this compound is well adapted to the extractive treatment of mineral lubricating oil stocks for the production therefrom of lubricating oil products having a high viscosity index and also characterized by other desirable properties.

By way of specific example, a dewaxed distillate lubricating oil fraction derived from Mid-Continent crude was extracted with methyl furfural in a batch type of operation. This distillate oil had tests as will be indicated below.

In making this extraction, one volume of oil was treated with two volumes of the solvent liquid at a temperature of 136° F. After complete mixing, the mixture was allowed to stand and separate into extract and raffinate phases. These phases were separately removed and the solvent recovered therefrom by distillation.

After removal of the solvent, the resulting raffinate and extract oil fractions were found to have the following tests, as compared with those of the oil before treatment:

|  | Charge | Raffinate | Extract |
|---|---|---|---|
| Gravity A. P. I. | 21.7 | 26.7 | 8.0 |
| Color tag rob | 3.0 | ¼ | |
| Kinematic Viscosity: | | | |
| At 100° F | 385 | 199.4 | |
| At 210° F | 20.1 | 15.1 | |
| Saybolt Universal viscosity: | | | |
| At 100° F | 1774 | 918 | |
| At 210° F | 99.0 | 78.4 | |
| V. I. (Dean & Davis) | 57 | 80 | |
| Viscosity gravity constant | .855 | .819 | |
| Yield percent of Charge | 100 | 74.5 | 25.5 |

NOTE: Saybolt Universal viscosity converted from kinematic viscosity.

From the foregoing, it appears that the yield of raffinate oil amounted to 74.5%, and that this oil had a viscosity index of 80. These results were obtained by extracting with only two volumes of solvent to one volume of oil, so that the results indicate that this compound is quite efficient as an extraction solvent for the separation of lubricating oil into fractions respectively rich in low and high viscosity index constituents.

While in the foregoing example, the solvent was used alone, it is contemplated that in certain cases it may be of advantage to carry out the extraction in the presence of auxiliary solvents, such, for example, as benzol or light petroleum hydrocarbons, such as derived from natural gasoline.

Moreover, this compound may be used for extracting either a wax-bearing or a dewaxed oil, and furthermore the extraction step may be carried out in conjunction with the dewaxing of the oil, in which case the extraction solvent advantageously comprises a component of the dewaxing solvent. When used as a component of the dewaxing solvent, the methyl furfural, due to the nature of its selective action, serves to impart anti-solvent action for the wax constituents of the oil.

It is, therefore, contemplated using the methyl furfural as a common solvent in a combination process involving the steps of either extracting followed by dewaxing, or dewaxing followed by extraction.

Where extraction precedes dewaxing, the raffinate phase resulting from the extraction will comprise a mixture of wax-bearing oil and some extraction solvent. Additional selective solvent as well as an auxiliary solvent, such as benzol, is then advantageously mixed with the raffinate phase, and the mixture chilled to precipitate the wax. The precipitated wax can then be removed by filtering or centrifuging.

On the other hand, where it is desired to dewax first, the wax-bearing oil may be mixed with methyl furfural and an auxiliary solvent, such as benzol, or benzol and toluol, in proportions such that at temperatures of around 0° F. and below, the mixture has substantially complete selective action upon the liquid constituents of the oil, and substantially no solvent action on the solid hydrocarbon constituents. This mixture is then chilled to precipitate the solid hydrocarbons, and the solid hydrocarbons so precipitated removed.

The solvent composition of the resulting dewaxed mixture is then modified either by removal of a part or all of the benzol, or by the addition of a further quantity of methyl furfural, so that the resulting mixture will separate into extract and raffinate phases.

The extraction step, of course, may be carried out either in batch or by countercurrent methods.

While the treatment of a distillate lubricating oil fraction has been described in the example, it is contemplated that the solvent may be used for the extraction of residual lubricating oil fractions, and that it may also be used for the treatment of other fractions of petroleum, such as naphtha, kerosene, etc.

Obviously, many modifications and variations of the invention, as hereinbefore set forth, may be made without departing from the spirit and scope thereof, and therefore only such limitations should be imposed as are indicated in the appended claims.

I claim:

1. The method of separating hydrocarbon oil containing paraffinoid and non-paraffinoid constituents into fractions respectively rich in said constituents comprising mixing the oil with methyl furfural, forming an extract phase containing non-paraffinoid constituents dissolved in the solvent liquid, and a raffinate phase comprising paraffinoid constituents, and separating the two phases.

2. The method of separating hydrocarbon oil containing paraffinoid and non-paraffinoid constituents into fractions respectively rich in said constituents comprising mixing the oil with a solvent comprising methyl furfural, forming an extract phase containing non-paraffinoid constituents dissolved in the solvent liquid, and a raffinate phase comprising paraffinoid constituents, and separating the two phases.

3. The method of separating mineral lubricating oil containing high and low viscosity index constituents into fractions respectively rich in low and high viscosity index constituents which comprises extracting the oil with a solvent comprising methyl furfural, forming an extract phase containing low viscosity index constituents of the oil dissolved in the bulk of the solvent, and a raffinate phase comprising high viscosity index constituents mixed with some solvent, and separating the two phases.

4. In the refining of wax-bearing lubricating oil stock to produce lubricating oil of low pour test and high viscosity index wherein the oil is extracted with methyl furfural to remove low viscosity index constituents, the step in combination with extraction of the oil comprising dewaxing the oil with a selective solvent consisting in part of methyl furfural.

FRANCIS X. GOVERS.